United States Patent [19]

Bernstein

[11] Patent Number: 5,003,758

[45] Date of Patent: Apr. 2, 1991

[54] DISPOSABLE DEBRIS BAG FOR LAWNMOWERS AND SWEEPERS

[76] Inventor: Arnold Bernstein, 8915 Owensmouth Ave., Canoga Park, Calif. 91304

[21] Appl. No.: 474,493

[22] Filed: Feb. 2, 1990

[51] Int. Cl.⁵ .......................................... A01D 34/70
[52] U.S. Cl. ..................................... 56/202; 56/16.6; 56/320.2; 56/473.5; 15/349
[58] Field of Search ...................... 56/202, 320.2, 16.6, 56/473.5; 47/9, 66, 74; 383/71, 78, 66; 15/347, 349, 257.3

[56] References Cited

U.S. PATENT DOCUMENTS

| | | | |
|---|---|---|---|
| 2,918,694 | 12/1959 | Tarrant | 56/202 X |
| 3,290,854 | 12/1966 | MacMurry | 383/71 X |
| 3,426,393 | 2/1969 | Mead | 383/71 X |
| 3,867,324 | 2/1975 | Clendinning et al. | 47/74 X |
| 3,995,414 | 12/1976 | Kerr et al. | 56/202 |
| 4,030,273 | 6/1977 | Leader | 56/202 X |
| 4,505,095 | 3/1985 | Short, Sr. | 56/202 |
| 4,747,259 | 5/1988 | Kline et al. | 56/320.2 X |

*Primary Examiner*—Stephen J. Novosad
*Attorney, Agent, or Firm*—William H. Maxwell

[57] ABSTRACT

A disposable biodegradable debris collection bag of thin walled flexible plastic having a neck with a collar to slide onto a discharge boot of a debris discharging machine and characterized by primary and secondary securement means of twist-tie form independently operable to constrict the collar onto the boot and to close the bag for removal.

14 Claims, 2 Drawing Sheets

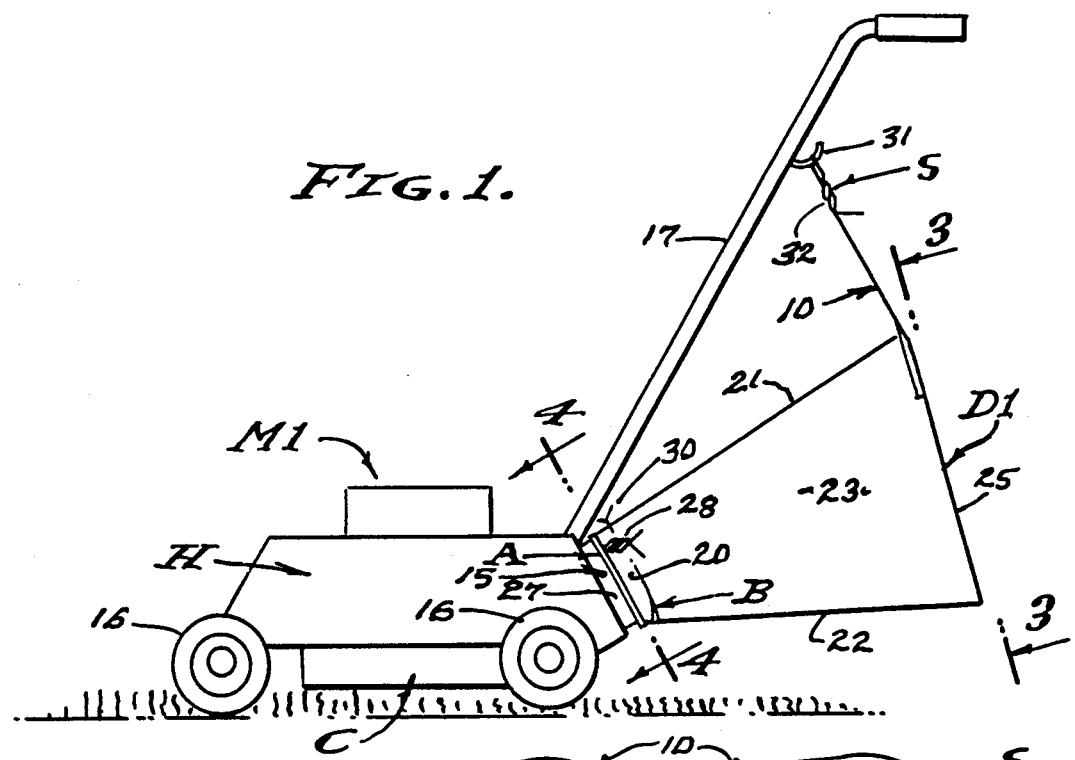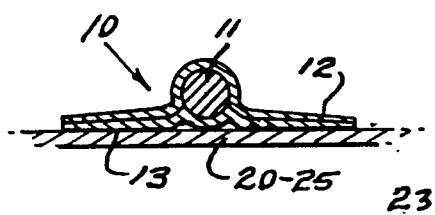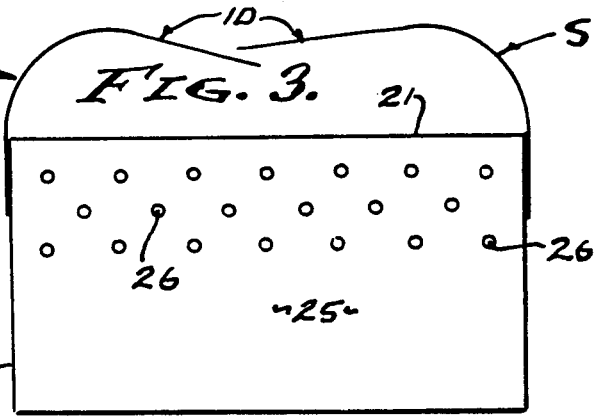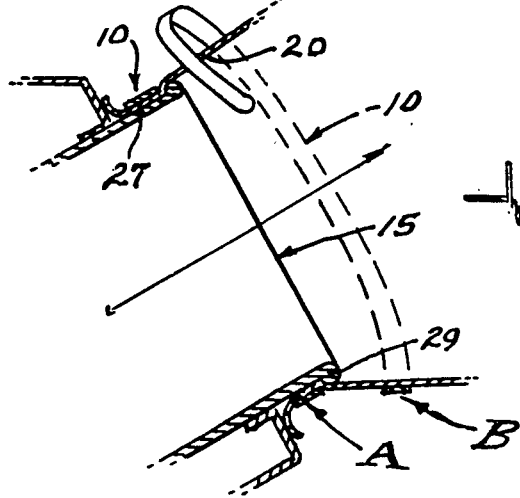

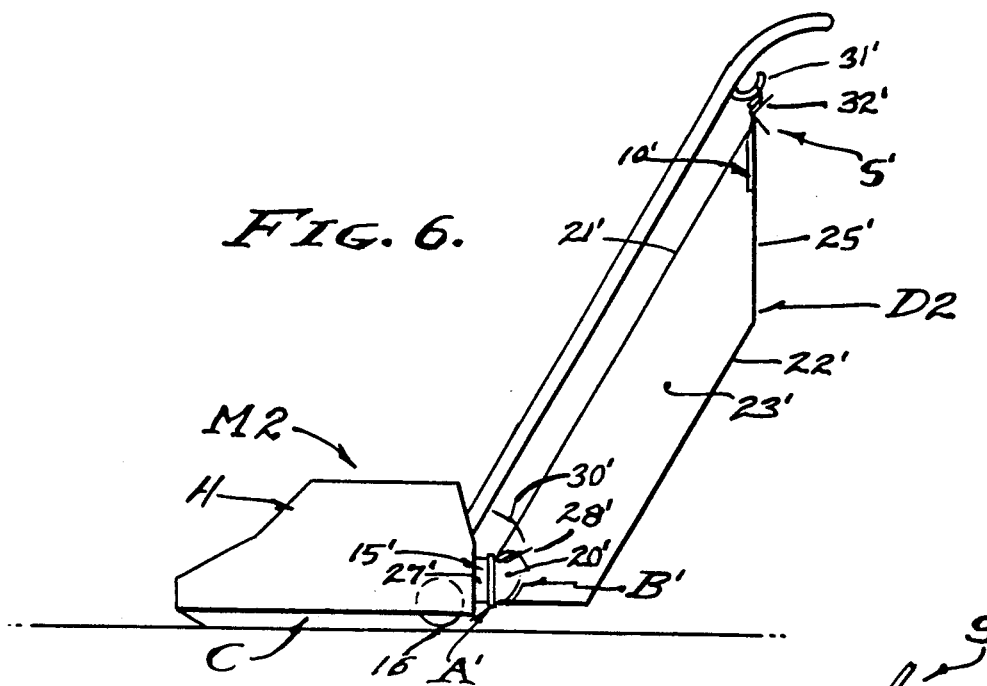
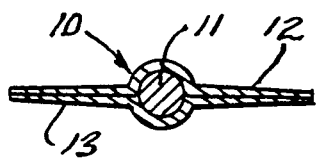
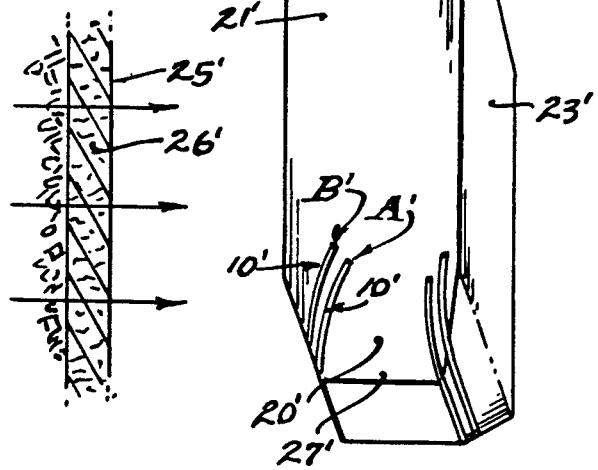
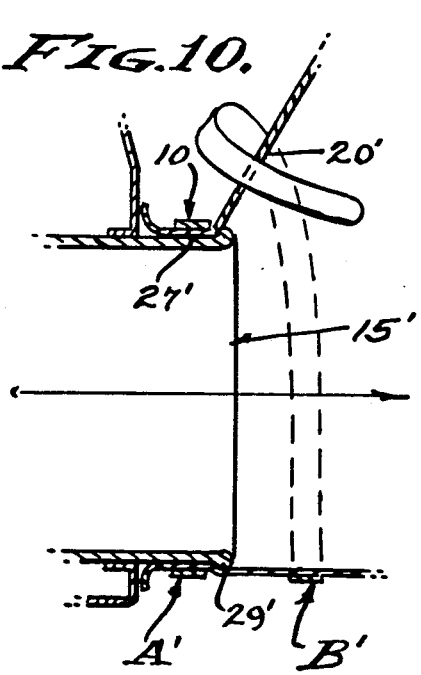

DISPOSABLE DEBRIS BAG FOR LAWNMOWERS AND SWEEPERS

BACKGROUND OF THE INVENTION

This invention relates to debris bags for the collection of trash and/or dust from machines such as lawnmowers, trash sweepers and vacuum sweepers, and the like. Heretofore, the collection bins and bags of such machines have been permanent and have required frequent emptying with attendant difficulty and inconvenience. Particular reference is made to lawnmowers with push handles, and to upright sweepers with push handles, and not to preclude tank-type vacuums wherein a disposable bag is inserted into a permanent chamber, the chamber restricting the size of the bag and requiring opening and partial disassembly of the machine for replacement of the bag. In the case of permanent prior art bags, they are characteristically of an expensive tightly woven fabric which passes air under internal pressure, while preventing the escape of debris (including dust). In the case of the lawnmowers or garden trash sweepers, they are characterized by a bin of perforate material or mesh, structurally permanent with respect to the machine.

In a first embodiment, the machine disclosed is a lawnmower wherein the disposable bag is a pliable and supple biodegradable plastic material with small vent openings for the discharge of air under pressure developed as a result of the blowing force of debris driven into the bag. The neck of the bag is characterized by the presence of primary and secondary securement means A and B. The primary securement means A releasably attaches to the discharge housing of the machine by deformable twist tie means fastened over the bag opening or neck so as to constrict the bag into sealed engagement with the discharge boot (or adapter) of the machine, and so as to be releasable. The secondary securement means B closes the bag following the discharge boot of the machine by deformable twist tie means, to seal the bag prior to its removal from the machine. The top end of the bag is suspended by at least one tie hooked to the push handle of the machine. In view of the above it is a general object of this invention to provide an expendable and disposable debris bag for trash collection.

In a second embodiment, the machine disclosed herein is a vacuum sweeper, or cleaner, wherein the disposable bag is of pliable and supple biodegradable material with at least one panel of porous filter material for the discharge of air pressure while retaining fine dust and debris discharged from the machine. In lieu of the at least one porous panel, any one or more of the bag panels can be made of biodegradable porous filter material, for example of the fiber paper currently used for such bags. The neck of the bag is characterized by the presence of the primary and secondary securement means A and B. The primary securement means A releasably attaches to the discharge housing of the machine by deformable twist tie means fastened over the bag opening or neck so as to constrict the bag into sealed engagement with the discharge boot (or adapter) of the machine, and so as to be releasable. The secondary securement means B closes the bag following the discharge boot of the machine by twist tie means, to seal the bag prior to its removal from the machine. The top end of the bag is suspended by at least one tie hooked to the push handle of the machine. In view of the above it is a general object of this invention to provide an expendable and disposable debris bag for dust collection.

Referring generally to this invention, the bags are preferably of supple plastic material that is biodegradable, and of suitable thickness folded flat and packaged for compact storage. The panels of the bag are typically flat sheets integrally folded and permanenetly affixed, preferably as shown folded into flat configuration for storage. The bags are subsequently unfolded and the neck thereof attached to the discharge boot or housing of the machine. Filling of the bag is directly observed from its exterior. Securement of the secondary seal B previous to release of the primary seal is effective in preventing spillage of trash. And the use of thin plastic sheeting and/or filtering material is conductive to a light weight cost effective product which is expendable in its disposal.

It is an object of this invention to provide a time saving and cost effective debris disposal bag for use in combination with mowers, sweepers and vacuums, characteristically expendable and effective to entrap debris without spillage. A feature of this invention is the relationship of primary and secondary securement means, one for attachment to the debris collecting machine, and the other for confinement of the debris once it is collected within the bag. The utility of this bag securement arrangement is inherent in its application to such machines in actual operation, and its implementation is accomplished with facility. The neck attachment of the bag to the machine is extremely versatile, and securement to special machines is by simple adaptation with the use of adapters for reliable securement. A preferred means of securement is a maleable strip type fastener referred to herein as a "twist tie". However, it is to be understood that substitute securement means of equivalent form can be employed.

SUMMARY OF THE INVENTION

An expendable debris bag for securement to and use in combination with a lawnmower, sweeper, or vacuum, and the like, is provided for the reception and containment of debris forceably discharged by the machine. The bag per se is made of inexpensive light weight material, porosity for the discharge of air being provided for therein. A feature is the provision of a neck opening having two securement means, a first securement means for attachment to the debris collecting machine, and a second securement means for the entrapment and confinement of the debris collected. Said first and second securement means are readily manipulated sequentially as required, each for its one-time purposful operation as herein set forth and described.

The foregoing and various other objects and features of this invention will be apparent and fully understood from the following detailed description of the typical preferred forms and applications thereof, throughout which description reference is made to the accompanying drawings.

THE DRAWINGS

FIG. 1 is a side view of the disposable debris bag of the present invention shown combined with a lawnmower.

FIG. 2 is an enlarged detailed sectional view through a twist-tie member as it is applied to a wall of the bag.

FIGS. 3 and 4 are views taken as indicated by line 3—3 and 4—4 on FIG. 1.

And, FIG. 5 is an enlarged sectional view showing the means of securement of the bag to the lawnmower.

FIG. 6 is a side view of the disposable debris bag of the present invention shown combined with a vacuum sweeper.

FIG. 7 is an enlarged detailed sectional view through a twist-tie member, as used herein.

FIG. 8 is an enlarged perspective view of the debris bag, removed from the vacuum sweeper.

FIG. 9 is an enlarged fragmentary view of at least one porous panel of the bag.

And, FIG. 10 is an enlarged sectional view showing the means of securement of the bags to the vacuum sweeper.

PREFERRED EMBODIMENT

Referring now to the drawings, FIGS. 1 and 6 each shows a machine M1 and M2 to which the debris bags D1 are applied by first and second, primary securement means A and secondary securement means B, and carried by support means S, said means being characterized by tie means universally adaptable to the various machine combinations encountered.

The tie means can vary in form, a twist-tie means being preferred for its simplicity, to tighten, to secure, and to release the debris bag, all with respect to the requirements of the machine to which it is adapted. As indicated in the drawings, the twist-ties are elongated flexible members 10, secured to the debris bag (D1-D2) as shown in FIG. 2, and having a general cross section as shown in FIG. 7. The twist-tie features a malleable body, a soft metal wire 11, encased within a lamination of two plies 12, 13 adhered one to the other with the wire 11 encapsulated therebetween. The plies 12 and 13 are of a width to facilitate manipulation, and the soft malleable wire provides for securement when two such wire ends are turned spirally with respect to each other. In practice, twist turning of the wire ends draws them together for tightening a loop of such wire over an object to be engaged thereby. Such twist-ties are available in the arts, for example for packaging.

The machines M1 and M2 share common elements, in that they both include a housing H open to the supporting terrain or floor to be cleaned of debris, and they include a debris collecting means C within the housing that forceably discharges debris from a boot 15 at the top rear of the housing. In practice, the housing is supported upon at least one pair of rollers or wheels 16, so that the collecting means C is juxtaposed to the supporting terrain or floor, as shown in FIGS. 1 and 6. And, the machines are driven over the terrain or floor by an upwardly extending and rearwardly accessible handle 17, by which the machine is negotiated and/or guided as circumstances require. Power for the collecting means C is by any suitable prime mover such as an internal combustion engine or by an electric motor, all as may be desired. However, the characteristic feature is the discharge boot 15 that discharges the cuttings and/or trash, debris, from the housing H, sometimes broadcasting it, and other times collecting it in a bin or the like. It will be understood that the configurations of machines M1 and M2 can vary widely, with different forms of discharge boots 15 to which the debris bags D1 and D2, as herein disclosed, are applied.

Referring now to the embodiment shown in FIGS. 1 through 5 of the drawings, the machine M1 is a lawnmower comprised of the elements hereinabove described and to which the bag D1 is attached to the boot 15 by the securement means A and supported from the handle 17 by the support means S. Discharge of debris from the boot 15 and into the bag D1 is indicated by the arrow in FIG. 5, the bag being an envelope of thin walled flexible material, preferably of plastic sheet having a debris access neck 20 and air exhaust perforations 26. In practice, the neck 20 defines the forward opening of the bag D1, while the exhaust perforations 26 are remote from the neck and are at the rear end of the bag. As shown, the bag envelope is flat sided, having a flat top 21, a bottom 22, sides 23-24, and a rear wall 25, integral at their adjoining edges and/or corners where they are folded flat one against the other for storage prior to use on the machine. As shown, in FIG. 3, the rear wall 25 has perforations 26 for exhausting air from the bag. In practice, the neck 20 is convergent to a collar portion 27 having a perimeter to fit over the boot 15, preferably a loose sliding fit. The walls 21-25 of the bag are of biodegradable material and preferably of disintegratable homoplastic material, one relating to or derived from another species, wherein there is a similarity of form with a different fundamental structure, and wherein there is a superficial resemblance. It is this type of plastic that is used herein; for example plastic comprised of as little as 5% starch mixed with as much as 95% polyurethane, or preferably "Novon" a trademark, a bio-plastic starch as manufactured by Warner-Lambert.

The primary securement means A is secured to the neck 20 to surround the forwardmost collar portion 27, and is comprised of a twist-tie member 10 affixed to the collar portion 27 as shown in FIG. 2 of the drawings. As shown in FIG. 1 this primary twist-tie member 10 is of length to wrap around the boot 15 with its opposite ends twisted together at 28. As shown, the boot 15 is channeled or provided with an enlarged lip 29 ahead of which the twist-tie member 10 is tightened so as to constrict the collar portion 27 onto the boot 15. In the event that a machine M1 does not have a suitable boot, then an adapter boot 15 of the same configuration is installed to receive the neck 20 of the bag D1.

In accordance with this invention, the secondary securement means B is secured to the neck 20 to surround the bag D1 rearward of the boot 15, and is comprised of a twist-tie member 10 affixed to the convergent neck 20 as shown in FIG. 2 of the drawings. As shown in FIG. 1, this secondary twist-tie member 10 is of a length to wrap around the neck portion 20 of the bag with its opposite ends twisted together at 30 substantially behind the open rear end of the boot 15. Accordingly, the secondary securement means B twist-tie member 10 can be tightened so as to constrict the neck 20 rearward of the collar portion 27 prior to the release of the primary securement means A, thereby closing the envelope of bag D1 before its release and removal from the machine M1.

The support means S is secured to the rear portion of the bag D1, at the rear wall 25, and is comprised of at least one twist-tie member 10 affixed to the bag wall as shown in FIG. 2 of the drawings. As shown in FIG. 1, the twist-tie member 10 is of a length to reach a hook 31 or the like at the underside of the handle 17, where it is secured as by twisting at 32. In practice, there is a pair of twist-tie members 10 extending upward from the opposite side walls 23 and 24, and tied together as indicated. Or, when the machine handle 17 is comprised of spaced and parallel members, then the two twist-tie members 10 are individually secured to spaced hooks 31 above respective sides of the bag, all as circumstances require. Adjustment as to height is made by twisting the twist-tie members 10 together as may be required.

Referring now to the embodiment shown in FIGS. 6 through 10 of the drawings, the machine M2 is a vacuum sweeper comprised of the elements hereinabove described and to which the bag D2 is attached to the boot 15' by the securement means A' and supported from the handle 17' by the support means S'. Discharge of debris from the boot 15 and into the bag D2 is indicated by the arrow in FIG. 10, the bag being an envelope of thin walled flexible material, preferably of plastic sheet having a debris access neck 20' and air exhaust means 26'. In practice, the neck 20' defines the forward opening of the bag D2, while the exhaust means 26' is incorporated into at least one of the walls of the bag. As shown, the bag envelope is flat sided, having a flat front (top) 21', back (bottom) 22', sides 23'-24', and rear wall 25', integral at their adjoining edges and/or corners where they are folded flat one against the other, accordion fashion, for storage prior to use on the machine. As shown in FIG. 9, the exhaust means 26' is incorporated in the rear wall 25' in the form of porous material for exhausting air only from the bag. It is to be understood that one or more walls 21'-25' of the bag can be of porous material stopping fine particles such as dust, as well as larger debris. In practice, the neck 20' is convergent to a collar portion 27' having a perimeter to fit over the boot 15', preferably a loose sliding fit. The walls 21'-25' of the bag are of biodegradable material and preferably of disintegratable homoplastic material as hereinabove described. It is this type of plastic that is used herein; for example the "Novon", a trademark, a bio-plastic starch as manufactured by Warner-Lambert.

The primary securement means A' is secured to the neck 20' to surround the forwardmost collar portion 27', and is comprised of a twist-tie member 10' affixed to the collar portion 27' as shown in FIG. 10 of the drawings. As shown in FIG. 6 the twist-tie member 10' is of a length to wrap around the boot 15' with its opposite ends twisted together at 28'. As shown, the boot 15' is channeled or provided with an enlarged lip 29' ahead of which the twist-tie member 10' is tightened so as to constrict the collar portion 27' onto the boot 15'. In the event that the machine M2 does not have a suitable boot, then an adapter boot 15' of the same configuration is installed to receive the neck 20' of the bag D2.

In accordance with this invention, the secondary securement means B' is secured to the neck 20' to surround the bag D2 rearward of the boot 15', and is comprised of a twist-tie member 10' affixed to the convergent neck 20' as shown in FIG. 10 of the drawings. As shown in FIG. 6, the twist-tie member 10' is of a length to wrap around the neck portion 20' of the bag with its opposite ends twisted together at 30' substantially behind the open rear end of the boot 15'. Accordingly, the secondary securement means B', twist-tie member 10', can be tightened so as to constrict the neck 20' rearward of the collar portion 27' prior to the release of the primary securement means A', thereby closing the envelope of bag D2 before its release and removal from the machine M2.

The support means S' is secured to the rear portion of the bag D2, at the rear wall 25', and is comprised of at least one twist-tie member 10' affixed top the bag wall as shown in FIG. 6 of the drawings. As shown in FIG. 6, the twist-tie member 10' is of a length to reach a hook 31' or the like at the underside of the handle 17', where it is secured as by twisting at 32'. In practice, there can be a pair of twist-tie members 10' extending upward from the opposite side walls 23' and 24' and tied together as indicated. Adjustment as to height is made by twisting the twist-tie members 10' together as may be required.

Having described only the typical preferred forms and applications of my invention, I do not wish to be limited or restricted to the specific details herein set forth, but wish to reserve to myself any modifications or variations that may appear to those skilled in the art as set forth within the limits of the following claims.

I claim:

1. A disposable bag for debris discharging machines having a rearwardly open debris discharge boot from which debris is forceably discharged, and including;
    an envelope of flexible thin walled sheet material having a neck portion convergent to a collar portion defining an opening to slidably fit over the rearwardly opening discharge boot of the debris discharging machine,
    a primary securement means carried by and for releasably securing the collar portion onto the discharge boot,
    and a secondary securement means carried by the neck portion rearward of the collar portion for closing the envelope prior to release of the primary securement means.

2. The disposable bag for debris discharging machines as set forth in claim 1, wherein the thin walled sheet material of the envelope is biodegradable plastic.

3. The disposable bag for debris discharging machines as set forth in claim 1, wherein the envelope forming the bag includes air exhaust means.

4. The disposable bag for debris discharging machines as set forth in claim 3, wherein the air exhaust means is comprised of perforations in at least one wall of the envelope.

5. The disposable bag for debris discharging machines as set forth in claim 3, wherein the air exhaust means is comprised of at least one porous wall of the envelope.

6. The disposable bag for debris discharging machines as set forth in claim 1, wherein the primary securement means is a tie means constricting the collar portion of the envelope onto the discharge boot.

7. The disposable bag for debris discharging machines as set forth in claim 1, wherein the secondary securement means is a tie means constricting the neck portion of the envelope.

8. The disposable bag for debris discharging machines as set forth in claim 1, wherein the primary and secondary securement means are tie means independently constricting the collar portion and neck portion of the envelope.

9. The disposable bag for debris discharging machines as set forth in claim 6, wherein the tie means of the primary securement means is a twist-tie means including an elongated malleable member encapsulated in material secured to the neck portion of the envelope.

10. The disposable bag for debris discharging machines as set forth in claim 7, wherein the tie means of the secondary securement means is a twist-tie means including an elongated malleable member encapsulated in material secured to said collar portion of the envelope.

11. The disposable bag for debris discharging machines as set forth in claim 8, wherein the tie means of the primary and secondary securement means are a twist-tie means including an elongated malleable member encapsulated in material secured to the collar portion and neck portion of the envelope.

12. The disposable bag for debris discharging machines as set forth in claim 1, wherein the debris discharge machine has an upwardly extending handle with a suspension hook, and wherein the envelope carries a support means for attachment to said hook.

13. The disposable bag for debris discharging machines as set forth in claim 12, wherein the support means is comprised of a tie means for attachment to said hook.

14. The disposable bag for debris discharging machines as set forth in claim 12, wherein the tie means is a twist-tie means including an elongated malleable member encapsulated in material secured to the envelope.

* * * * *